United States Patent
Bhat et al.

(10) Patent No.: US 9,690,564 B2
(45) Date of Patent: Jun. 27, 2017

(54) RUNTIME DETECTION OF SOFTWARE CONFIGURATIONS AND UPGRADES

(71) Applicant: International Business Machines Corporation, Armonk, NY (US)

(72) Inventors: B. G. Prashanth Bhat, Bangalore (IN); John Kurian, Bangalore (IN); Leho Nigul, Richmond Hill (CA); Hariharan N. Venkitachalam, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 324 days.

(21) Appl. No.: 14/022,345

(22) Filed: Sep. 10, 2013

(65) Prior Publication Data

US 2015/0074640 A1 Mar. 12, 2015

(51) Int. Cl.
*G06F 9/44* (2006.01)
*G06F 9/445* (2006.01)

(52) U.S. Cl.
CPC ..................... *G06F 8/65* (2013.01)

(58) Field of Classification Search
USPC ......................................................... 717/168
See application file for complete search history.

(56) References Cited

U.S. PATENT DOCUMENTS

| | | | | |
|---|---|---|---|---|
| 7,266,819 B2* | 9/2007 | Helgesen | ................... | G06F 8/68 709/217 |
| 7,496,912 B2* | 2/2009 | Keller | ....................... | G06F 8/61 717/120 |
| 7,568,195 B2 | 7/2009 | Markley et al. | | |
| 7,984,426 B2* | 7/2011 | Loff | ......................... | G06F 8/71 717/121 |
| 8,074,214 B2 | 12/2011 | Isaacson et al. | | |
| 8,452,742 B2* | 5/2013 | Hashimoto | .............. | G06F 8/71 707/695 |

(Continued)

FOREIGN PATENT DOCUMENTS

EP    1832976 A1    12/2007

OTHER PUBLICATIONS

Cmdbuilday, "Open Source configuration and management database", Product website: http://cmdbuild.org/en/index_html?set_language=en&cl=en, retrieved on Apr. 19, 2013.

(Continued)

*Primary Examiner* — Marina Lee
(74) *Attorney, Agent, or Firm* — Edward J. Wixted, III

(57) ABSTRACT

The present disclosure relates generally to the field of software configuration management, and more particularly to validating, detecting, and dynamically handling software configurations and updates. A computing device detects a configuration event in a first computer program. The computing device includes a plurality of executing computer programs, wherein the plurality of executing computer programs includes the first computer program and a second computer program, and wherein the first computer program has a configurational relationship to the second computer program. The computing program determines whether the configuration event affects the second computer program. The computing device generates an action in response to the determination.

17 Claims, 5 Drawing Sheets

(56) References Cited

U.S. PATENT DOCUMENTS

| | | | | |
|---|---|---|---|---|
| 8,544,016 | B2* | 9/2013 | Friedman | G06F 11/3664 717/107 |
| 2004/0153869 | A1* | 8/2004 | Marinelli | G06F 8/61 714/47.1 |
| 2005/0149925 | A1* | 7/2005 | Pichetti et al. | 717/177 |
| 2005/0192979 | A1* | 9/2005 | Keller | G06F 8/61 |
| 2006/0048145 | A1* | 3/2006 | Celli et al. | 717/177 |
| 2006/0265706 | A1* | 11/2006 | Isaacson et al. | 717/174 |
| 2007/0094673 | A1* | 4/2007 | Hunt | G06F 9/4411 719/321 |
| 2007/0220240 | A1* | 9/2007 | Su | G06F 9/24 712/248 |
| 2008/0163187 | A1* | 7/2008 | Loff | G06F 8/71 717/168 |
| 2009/0007097 | A1 | 1/2009 | Hinton et al. | |
| 2009/0064131 | A1 | 3/2009 | Ferris et al. | |
| 2009/0260004 | A1* | 10/2009 | Datta | G06F 8/65 717/175 |
| 2009/0300641 | A1* | 12/2009 | Friedman | G06F 11/3664 718/104 |
| 2011/0047536 | A1* | 2/2011 | Santos et al. | 717/170 |
| 2011/0055153 | A1* | 3/2011 | Hashimoto | G06F 8/71 707/622 |
| 2014/0130032 | A1* | 5/2014 | Lipinski | G06F 8/65 717/171 |
| 2015/0074640 | A1* | 3/2015 | Bhat et al. | 717/121 |
| 2015/0074657 | A1* | 3/2015 | Bhat | G06F 8/65 717/170 |

OTHER PUBLICATIONS

Badr et al., "A Conflict Resolution Control Architecture for Self-Adaptive Software", International Workshop on Architecting Dependable Systems: WADS 2002 (ICSE 2002). 2002. Florida USA.

CA Technologies, "Product Sheet: CA Configuration Automation", Source: IDC—Worldwide Change and Configuration Management Software 2011-2015 Forecast (Market Analysis Doc #227050/ Mar. 2011).

Dinkelaker et al., "A Dynamic Software Product Line Approach using Aspect Models at Runtime", First Workshop on Composition and Variability ' 10, Rennes, France co located with AOSD'2010, Copyright © 2010 ACM.

Distributed Management Task Force, Inc., "Configuration Management Database (CMDB) Federation Specification", Documnet No. DSP0252, Dated: Jun. 22, 2009, Version: 1.0.0.

IBM Software Product compatibility reports, "WebSphere Message Broker 8.0 on AIX", retrieved on Apr. 19, 2013 from website: http://pic.dhe.ibm.com/infocenter/prodguid/v1r0/clarity-reports/report/html/softwareReqsForProduct?deliverableId=1281962721-693 . . . .

IBM, "Packaging as plug-in JAR files", Copyright © IBM Corporation 1999, 2013, Version 8.0.0.2 retrieved from website: http://publib.boulder.ibm.com/infocenter/wmbhelp/v8r0m0/topic/com.ibm.etools.mft.doc/bs37530_.htm.

Novell, Inc., "Package management—openSUSE", retrieved from website: http://en.opensuse.org/Package_management, Copyright © 2011 Novell, Inc.

The Obix Framework, retrieved on Apr. 19, 2013 from website: http://obix-framework.sourceforge.net/.

Software Configuration, PDF generated using open source mwlib toolkit, website: http://code.pediapress.com on Wed, Jun. 5, 2013.

Wikipedia, "Binary File", retrieved on Aug. 29, 2013 from website: http://en.wikipedia.org/w/index.php?oldid=557481788.

Wikipedia, "Configuration management database", retrieved on Apr. 19, 2013 from website: http://en.wikipedia.org/wiki/Configuration_managment_database.

Wikipedia, "Library (computing)", retrieved on Apr. 19, 2013 from website: http://en.wikipedia.org/wiki/Configuration_management_database.

Yuan et al., "Context-based Online Configuration-Error Detection", Microsoft Research Silicon Valley, http://research.microsoft.com/pubs/146686/usenix11.pdf.

"What is configuration management database (CMDB)?", retrieved on Apr. 19, 2013 from website: http://searchdatacenter.techtarget.com/definition/configuration-management-database.

U.S. Appl. No. 14/316,989 entitled "Runtime Detection of Software Configurations and Upgrades" filed Jun. 27, 2014.

* cited by examiner

RUNTIME DETECTION OF SOFTWARE CONFIGURATIONS AND UPGRADES

BACKGROUND

The present disclosure relates generally to the field of software configuration management, and more particularly to validating, detecting, and dynamically handling software configurations and updates. Software is typically configured to operate in conjunction with other software, and, in particular, with certain versions of the software. Software versioning is the process of assigning unique version names or numbers to unique states of software. Software usually has mandatory configuration settings that are required for its proper operation. In addition, system consistency might be jeopardized if the software is run without proper configuration. Hence, software must be maintained after its deployment to ensure that its configuration is working well.

Software configuration management system (hereinafter "SCMS") is software that tracks and controls changes in software (hereinafter "configuration events") in a structured, orderly, and productive manner. A SCMS typically identifies, controls, and audits configuration events. Typically, when a SCMS discovers new software faults and/or requirements it determines what was changed and generates a notification. This is particular true in large scale information technology infrastructure where system consistency might be jeopardized if a software upgrade results in incompatible software. However, current SCMS offerings leave the validation of configuration event to the products themselves. In addition, current SCMS offerings do not verify that the configuration event is compatible with related software, nor do they confirm whether a reconfiguration would be required to maintain compatibility.

SUMMARY

The present disclosure relates generally to the field of software configuration management, and more particularly to validating, detecting, and dynamically handling software configurations and updates. A computing device detects a configuration event in a first computer program. The computing device includes a plurality of executing computer programs, wherein the plurality of executing computer programs includes the first computer program and a second computer program, and wherein the first computer program has a configurational relationship to the second computer program. The computing program determines whether the configuration event affects the second computer program. The computing device generates an action in response to the determination.

DETAILED DESCRIPTION

Figure 1:
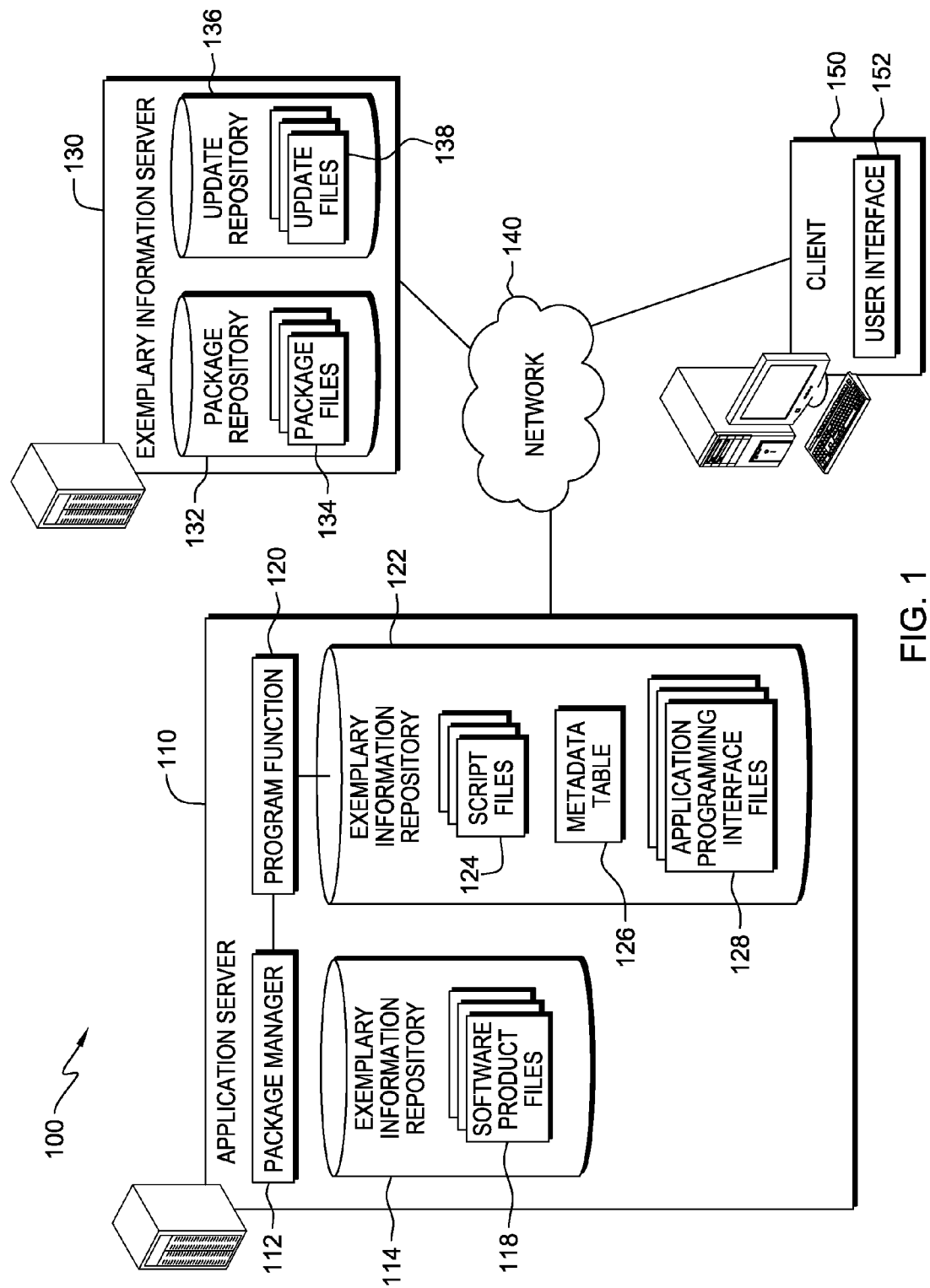
FIG. 1 is a block diagram of an environment, in accordance with an embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Embodiments of the present invention will now be described in detail with reference to the Figures. FIG. 1 is a block diagram illustrating an environment, generally designated 100, in accordance with one embodiment of the present invention.

Environment 100 includes client 150, exemplary server 130, and application server 110, all interconnected over network 140. Network 140 can be, for example, a local area network (LAN), a wide area network (WAN) such as the Internet, or a combination of the two, and can include wired, wireless, or fiber optic connections. In general, network 140 can be any combination of connections and protocols that will support communications between application server 110, client 150, and exemplary server 130.

In various embodiments of the present invention, application server 110, client 150, and exemplary server 130 may be a laptop computer, tablet computer, netbook computer, personal computer (PC), a desktop computer, a personal digital assistant (PDA), a smart phone, or any programmable electronic device capable of communicating via network 140. Client 150 is in communication with exemplary server 130 and application server 110 via network 140, in accordance with an embodiment of the present invention. Client 150 is a computing device that accesses services that are provided by application server 110. Client 150 includes user interface 152 which can be either text-based or graphics-based. Application server 110 may include internal and external hardware components, as depicted and described in further detail with respect to FIG. 5.

Exemplary information server 130 is in communication with client 150 and application server 110, via network 140, in accordance with an embodiment of the present invention. Exemplary information server 130 is a computing device that provides software packages and updates to application server 110, via network 140. Exemplary information server 130 includes package repository 132, which is an information store that includes package files 134 that includes software package files. Software packages are archives of files that include all the files that make up a piece of software, such as an application itself, shared libraries, development packages containing files needed to build software against a library. Software packages are typically built for a particular distribution, which is a specific packaging of an operating system containing components such as the Kernel, a tool chain, utilities, and other software. Package files 134 also include package dependencies, which are the execution files that are needed for actually executing the software. For example, software package A requires that software packages B, C, and D also be installed for its proper operation.

Exemplary information server 130 also includes update repository 136, which is an information repository that includes update files 138, in accordance with an embodiment of the present invention. Update files 138 are software designed to fix problems with, or update a computer program or its supporting data that is included in package files 134. This includes, for example, fixing security vulnerabilities and other bugs, and improving the usability or performance. Application server 110 is in communication with client 150 and exemplary information server 130 via network 130, in accordance with an embodiment of the present invention. Application server 110 provides application services to client computing devices, in accordance with an embodiment of the present invention.

In an embodiment, application server 110 includes package manager 112, exemplary information repositories 114 and 122, and program function 120. Package manager 112 is included in application server 110 and is in communication with exemplary information repository 114 and program function 120. Package manager 112 is software that installs, upgrades, configures, and removes software packages for a computer device. Some software products included in software products files 118 are configured to operate in conjunction with other software products also included therein, and, in particular, with certain versions thereof. Software versioning is the process of assigning either unique version names or unique version numbers to unique states of software. Software products, such as software products included in software product files 118, have mandatory configuration settings that are required for its proper operation. Package manager 112 performs configuration events, such as software installations, upgrades, configuration, and other tasks, such as software package removal. Software product files 118 are software packages that are installed on application server 110. Exemplary information repository 122 is in communication with program function 120, in accordance with an embodiment of the present invention. Software packages, such as those included in software package files 134, also include metadata, for example, product ID, version information, and/or support product information Exemplary information repository 122 is an information repository that is in communication with program function 120 and includes application programming interface (hereinafter "API) files 128, script files 124, metadata table 126, in accordance with an embodiment of the present invention. In another embodiment, API files 128, script files 124, and metadata table 126 are included in separate information repositories that are in communication with application server 110 via network 140. Script files 124 include predefined scripts that validate software configurations (hereinafter "configuration validator script") and detect software upgrades (hereinafter "upgrade detector script"). In an embodiment, configuration validator scripts included in script files 124 determines whether software products that are included in software product files 118 are configured. In another embodiment, upgrade detector scripts included in script files 124 determine whether software product included in software product files 118 have been upgraded. In an embodiment, script files 124 include predefined scripts that are associated with software products included in software product files 118 and/or software products types, such as web browser and operating system. In another embodiment, script files 124 store information in metadata table 126, such as whether a software product is configured, associated software products, and/or script location. For example, script files 124 utilize API files 128 to generate a result, such as whether a software product has been configured and/or upgraded. In an embodiment, package manager 112 performs configuration events on software products that are included in software product files 118 using information included in update files 138.

API files 128 include files that specify a set of functions or routines that accomplish a specific task. In an embodiment, API files 128 include a library that specifies routines, data structures, object classes, and/or variables. In another embodiment, API files 128 include an API that validates software configurations, such as the software included in software product files 118. In yet another embodiment, API files 128 include an API that detects software upgrades, such as upgrades to software included in software product files 118.

Metadata table 126 is included in exemplary information repository 122 and is a data structure that include at least a portion of the metadata associated with software installed on application server 110, for example, software product files 118, in accordance with an embodiment of the present invention. The information included in Table 1 includes information generated by script files 124. In another embodiment, metadata table 126 includes metadata received from software products during their installation. In an embodiment, metadata table 126 includes information formatted according to Table 1.

manager 112 and exemplary information repository 122, in accordance with an embodiment of the present invention. Program function 120 is software that detects and validates dependencies during the configuration of software products included in software product files 118. Program function 120 determines whether software products included in software product files 118 have been properly configured and/or upgraded. Program function 120 determines whether software product files 118 have been properly configured and/or upgraded using the configuration validator script and/or the upgrade detector script (discussed above). In an embodiment, program function 120 determines whether software product files 118 have undergone a configuration event utilizing the predefined scripts that are included in script files 124. In another embodiment, program function 120 generates metadata table 126 upon initialization. In yet another embodiment, program function 120 initialization includes retrieving utilities needed to manage metadata table 126. Program function 120 returns software products included in software product files 118 to a prior, if a configuration event interferes with the proper functioning of software included in software product files 118. Program function 120 detects and validates the pre-requisite and/or co-requisite configurational dependencies associated with software products included in software product files 118.

Figure 2:
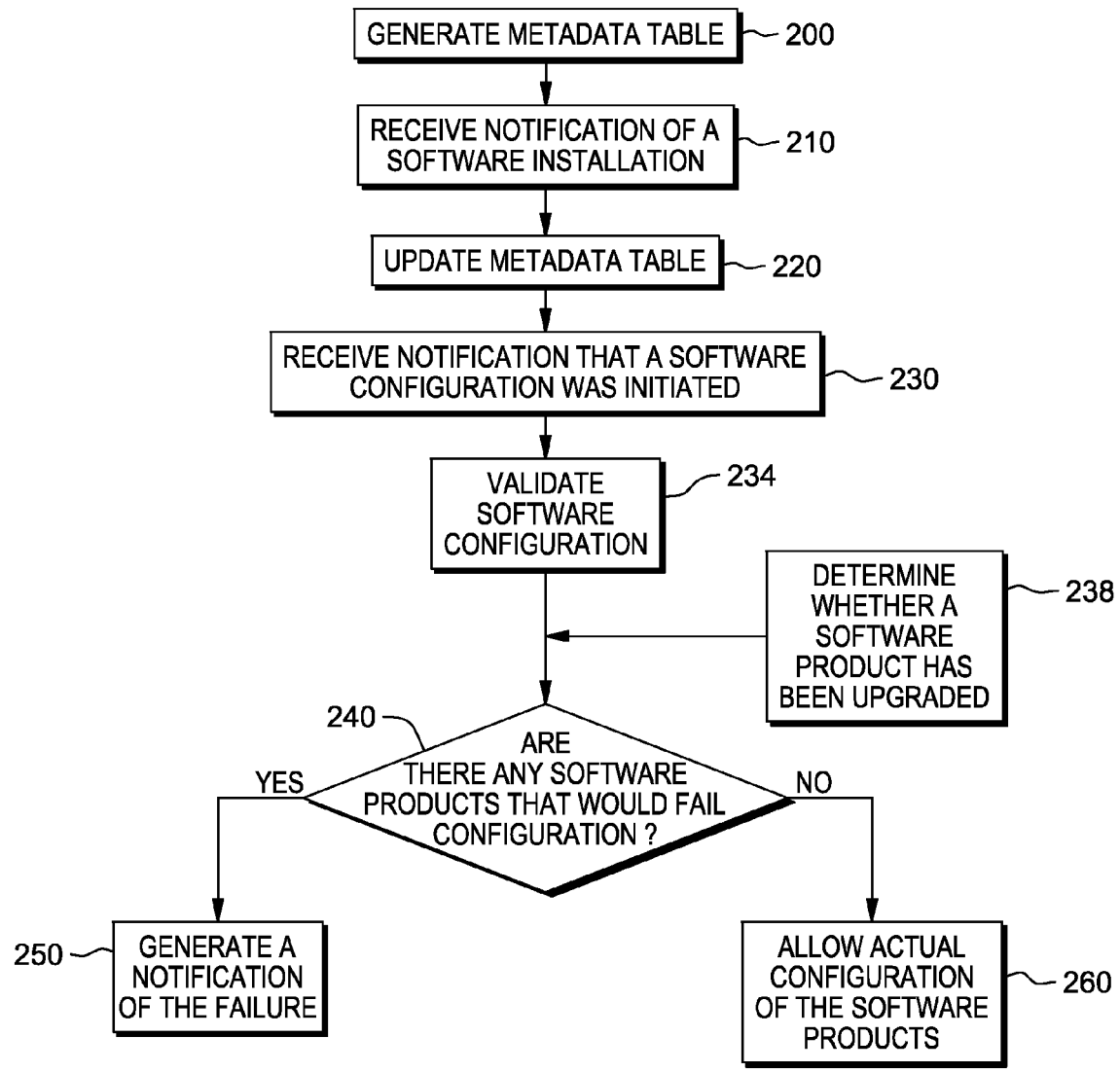
FIG. 2 is a flowchart depicting operational steps of a program function, in accordance with an embodiment of the present invention.

FIG. 2 is a flowchart depicting the operational steps of program function 120, in accordance with an embodiment of the present invention. Specifically, FIG. 2 is a flowchart depicting the operational steps of program function 120, on application server 110 within environment 100, for validating, detecting, and dynamically handling software product configuration events. In an embodiment, program function 120 initializes for properly execution, which includes generating metadata table 126 (step 200). In another embodiment, initialization also includes program function 120 retrieving utilities needed to manage metadata table 126.

In yet another embodiment, initialization includes program function 120 updating metadata table 126 with software product ID's for all software products included in application server 110. In yet still another embodiment, script files 124 updates metadata table 126 with information pertaining to their associated software products. Program function 120 receives notification of a software package installation (step 210). For example, program function 120

TABLE 1

| Stack Product Instance ID | Version of Base Product | Version of supported stack products | Configured | Validate script to run? | Upgrade script to run? | Configuration Validator Script Location | Upgrade Detector Script Location |
|---|---|---|---|---|---|---|---|

Software products are often developed to in conjunction with one another. For example, a base product, such as an operating system, is software that provides a level of functionality that can be expanded upon by other software (hereinafter "stack products"). As package manager 112 installs software packages on application server 110 it stores appropriate metadata that is included in the software package in metadata table 126.

Software products may have pre-requisite or co-requisite dependencies on one or more additional software products. Such dependencies may be critical, wherein a configuration event in a base product is not supported by an associated stack product and hinders the proper execution thereof. Program function 120 is in communication with package receives notification that package manager 112 installed binaries associated with software package A in the memory of application server 110. Binaries are applications, such as applications included in package files 134, which are compiled, for example, by package manager 112. For example, program function 120 receives notification that package manager 112 installed software package A, which is configured to operate with versions 7 and 9.7 of software packages B and C, respectively.

Program function 120 updates metadata table 126 (step 220). For example, program function 120, using the metadata included in software package A, determines that software package A is supported by version 2.02 of operating system X (the base product) and supports versions 7 and 9.7 of software packages B and C (the stack products). Subsequently, program function 120 updates metadata table 126 with the above determined metadata information. In an embodiment, package manager 112 may initiate configuration before or after step 220. Program function 120 receives notification that a software configuration has initiated (step 230). For example, program function 120 receives notification that package manager 112 initiated the configuration of software package A and, in response, instructs package manager 112 to halt the configuration.

Program function 120 validates the software configuration (step 234). For example, program function 120 uses information included in script files 124, metadata table 126, and API files 128 to determine whether the proposed software configuration of software product A has the proper dependencies to proceed error-free prior the execution of the proposed software configuration. Step 234 is described in further detail below in the discussion of FIG. 3. Program function 120 determines whether the software product would fail configuration (decisional 240). For example, program function 120 determines whether software package A would fail configuration. If program function determines that the software product would fail configuration ("yes" branch decisional 240), then program function 120 generates a notification of the failure (step "250").

If program function determines that the software product would not fail configuration ("no" branch decisional 240), then program function 120 allows the actual configuration of the software product (step 260). For example, program function 120 instructs package manager 112 to proceed with the halted configuration of software package A.

Program function 120 executes during runtime when commands of software products, such as software product A, are invoked. Program function 120 executes during runtime to determine whether the current configuration of software product A is still valid with any software products that have been upgraded. Runtime execution of program function 120 is captured in step 238, wherein program function 120 determines whether a software product was upgraded since it was last executed. In an embodiment, program function 120 executes step 238 in a predetermined fashion, for example, upon the execution of all major command invocations and/or periodically. Step 238 is described in further detail below in the discussion of FIG. 4.

Figure 3:
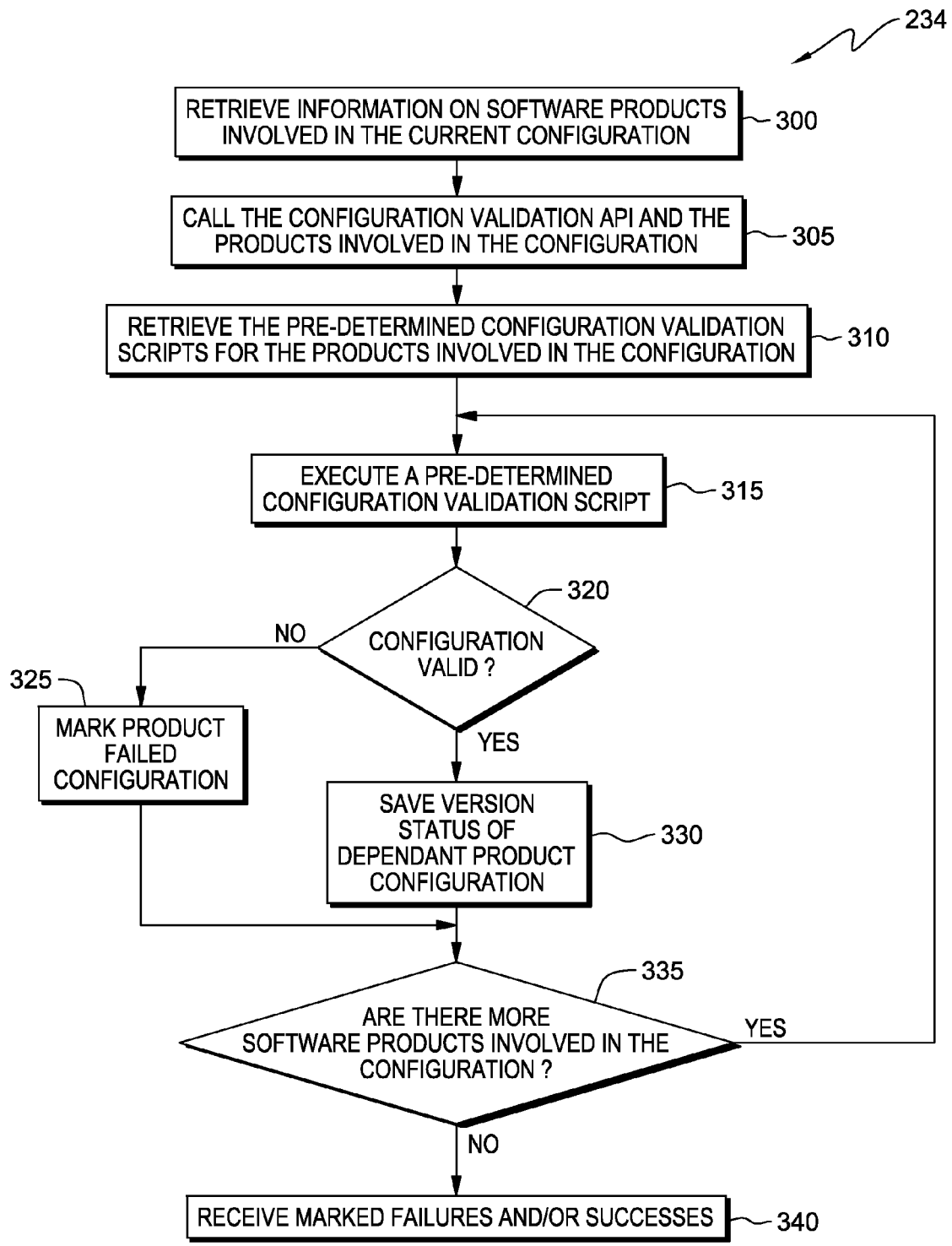
FIG. 3 is a flowchart depicting operational steps of a program function, for validating software configurations, in accordance with an embodiment of the present invention.

FIG. 3 is a flowchart depicting the operational steps of program function 120, in accordance with an embodiment of the present invention. Program function 120 retrieves information on software products involved in the current configuration (step 300). For example, program function 120 retrieves information on software products A, B and C from metadata table 126, such as the current versions of software products B and C that are installed on server 110 and the versions thereof that are required by software package A. Program function 120 calls the configuration validation API (step 305). For example, program function 120 calls the configuration validation API that is included in API files XYZ. The configuration validation API executes the pre-determined configuration validation scripts for software packages A, B, and C that are included in script files XYZ and returns a status code for each result, such as success or failure. Program function 120 determines whether the initiated software product configuration would be valid (decisional 320). For example, program function 120 determines whether the initiated configuration of software product A would be valid by determining the status code of the configuration validation API. The status code for success results when all executed scripts that are associated with the configuration of software package A return without error.

If program function 120 determines that the initiated configuration would not be valid ("no" branch decisional 320), program function 120 marks the software product as having a failed configuration and proceeds to step 335 (step 325). For example, if program function determines that one or more of the pre-determined configuration validation scripts returned with error, then program function 120 marks software package A as having failed configuration and proceeds to step 325. If program function 120 determines that the initiated configuration would be valid ("yes" branch decisional 320), then program function 120 saves the version information of the software product to be configured and proceeds to step 335 (step 330). Program function 120 determines whether there are additional software products involved in the initiated configuration (decisional 335). If program function 120 determines that there are additional software products involved in the initiated configuration ("yes" branch decisional 335), then program function 120 proceeds to step 315.

If program function 120 determines that there are no additional software products involved in the initiated configuration ("no" branch decisional 335), then program function 120 receives all marked failures and/or successes (step 340). For example, program function 120 receives all the marked failure and/or successes from the configuration validation API. Subsequent to step 340, program function 120 proceeds to step 240 (discussed above).

Figure 4:
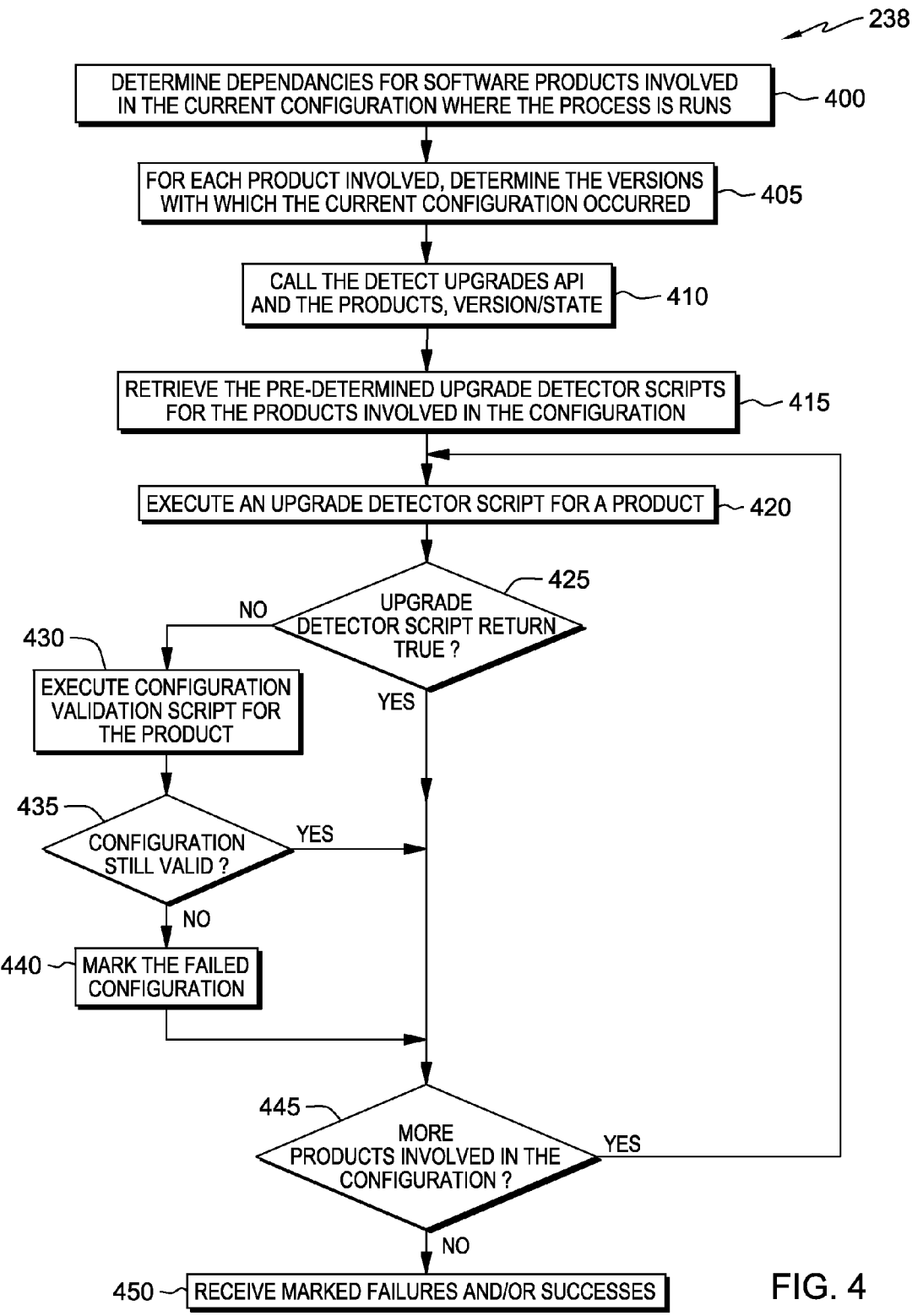
FIG. 4 is a flowchart depicting the operational steps of a program function, in accordance with an embodiment of the present invention.

FIG. 4 is a flowchart depicting the operational steps of program function 120, in accordance with an embodiment of the present invention. Specifically, FIG. 4 depicts the operational steps of program function 120 for performing step 238. Program function 120 executes step 238 when a command of an installed and configured software product, for example, software product A, is invoked to determine whether the configuration of the software product is valid. Program function 120 determines all dependencies involved in the current configuration of the software product that has a process running (step 400). For example, program function 120 determines the dependencies associated with software package A that are included in metadata table XYZ.

For each software product involved in the current configuration of the software product, program function 120 determines the versions with which the current configuration occurred (step 405). For example, program function 120 determines the versions with which the current configuration occurred by retrieving the information from metadata table XYZ. Program function 120 calls the detect upgrades API (step 410). For example, program function 120 calls the detect upgrades API that is included in API files 128, which retrieves the pre-determined upgrade detector scripts for software products A, B, and C and executes them. Program function 120 determined whether the upgrade detector script returns true (decisional 425).

If program function 120 determines that the upgrade detector script does not return true ("no" branch decisional 425), program function 120 executes the configuration validator script for the software product (step 430). Hence, program function 120 executes step 430 when it detects that an upgrade has occurred to a software package involved in the current configuration in order to determine whether the detected upgrade invalidates the current configuration of the executing software package, such as software product A. Program function 120 determines whether the configuration is still valid (decisional 435). If program function 120 determines that the configuration is still valid ("yes" branch decisional 435), then program function 120 proceeds to decisional 445. If program function 120 determines that the configuration is not valid ("no" branch decisional 435), then program function 120 marks the corresponding configuration as failed (step 440). In an embodiment, if program function 120 determines that the configuration is not valid, then program functions returns the affected software package, for example, software product A, to a prior version that did not result from the configuration.

Program function 120 determines whether there are additional products involved in the initiated configuration (decisional 445). If program function 120 determines that there are additional software products involved in the initiated configuration ("yes" branch decisional 445), then program function 120 proceeds to step 420. If program function 120 determines that there are no additional software products involved in the initiated configuration ("no" branch decisional 445), then program function 120 receives the marked failures and/or successes (step 450). Subsequent to step 450, program function 120 proceeds to decisional 240 (discussed above).

Figure 5:
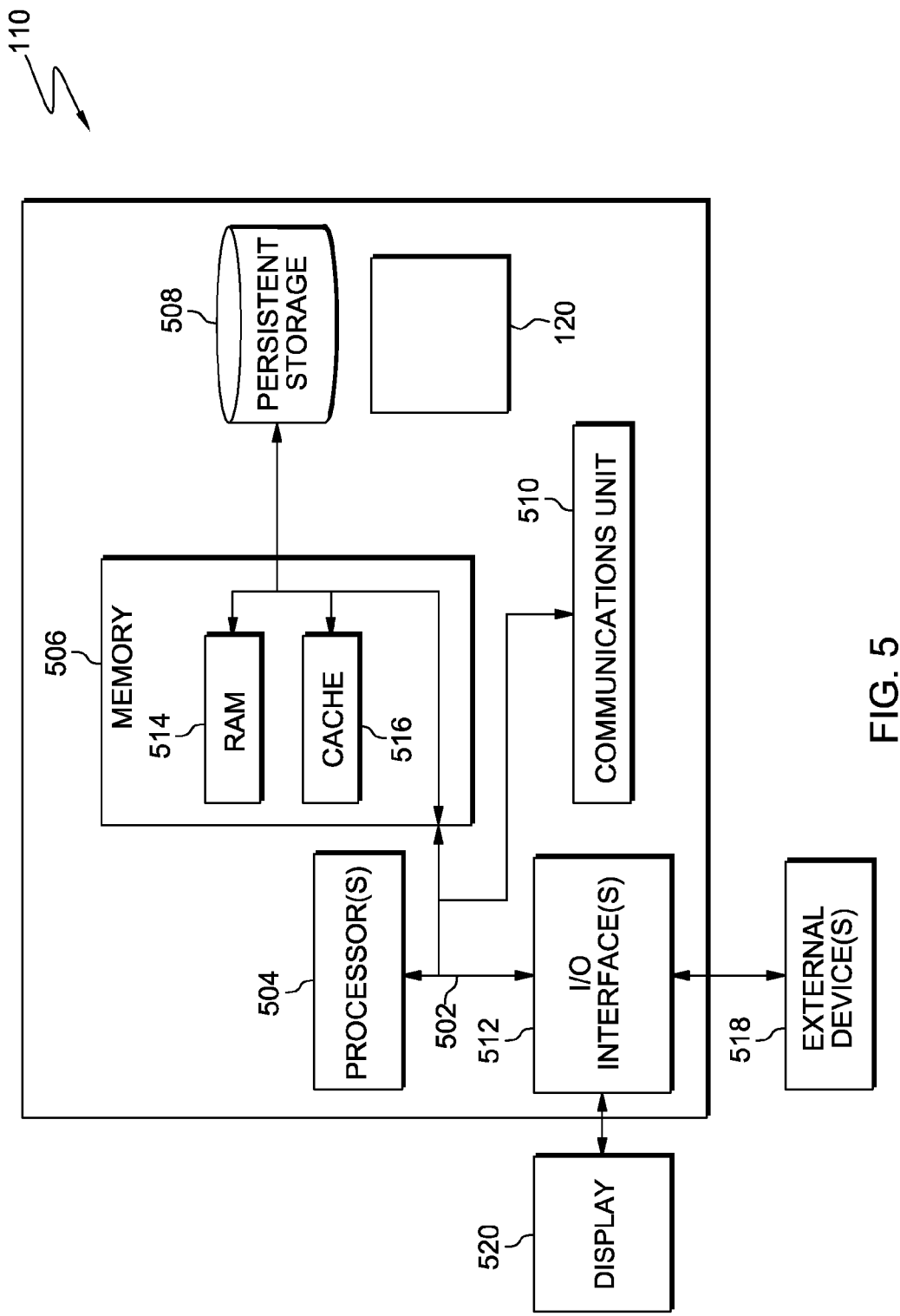
FIG. 5 depicts a block diagram of components of an application server, in accordance with an embodiment of the present invention.

FIG. 5 depicts a block diagram of components of application server 110, in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Application server 110 includes communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 514 and cache memory 516. In general, memory 506 can include any suitable volatile or non-volatile computer-readable storage media.

Program function 120, package manager 112, and exemplary information repositories 114 and 122 are stored in persistent storage 508 for execution and/or access by one or more of the respective computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer-readable storage medium that is also part of persistent storage 508.

Communications unit 510, in these examples, provides for communications with other data processing systems or devices, including exemplary information server 130 and client 150. In these examples, communications unit 510 includes one or more network interface cards. Communications unit 510 may provide communications through the use of either or both physical and wireless communications links. Program function 120 and package manager 112 may be downloaded to persistent storage 508 through communications unit 510.

I/O interface(s) 512 allows for input and output of data with other devices that may be connected to application server 110. For example, I/O interface 512 may provide a connection to external devices 518 such as a keyboard, keypad, a touch screen, and/or some other suitable input device. External devices 518 can also include portable computer-readable storage media such as, for example, thumb drives, portable optical or magnetic disks, and memory cards. Software and data used to practice embodiments of the present invention, e.g., program function 120 and package manager 112, can be stored on such portable computer-readable storage media and can be loaded onto persistent storage 508 via I/O interface(s) 512. I/O interface(s) 512 also connects to a display 520. Display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer program product, the computer program product comprising a computer readable hardware storage device having program code embodied therewith, the program code executable by a processor to:
   detect an upgrade, from a first version to a second version, of a first computer program that is executing on a computing device that includes the processor, wherein the computing device includes a plurality of executing computer programs, wherein:
      the plurality of executing computer programs includes the first computer program and a second computer program; and the upgrade comprises an installation of a first package associated with the first computer program, wherein the first package includes a first set of metadata;

update a table with the first set of metadata of the first package, wherein:

the table includes a second set of metadata associated with the first computer program and a third set of metadata associated with the second computer program; and the metadata associated with each of the first computer program and the second computer program includes, at least, a configurational dependency;

determine that the second computer program has the configurational dependency to the first computer program, based on the updated table;

determine that the upgrade is unsupported by the second computer program, based on the updated table; and generate an action in response to the determination that the upgrade is unsupported by the second computer program.

2. The computer program product of claim 1, wherein the computer code to detect occurs during runtime.

3. The computer program product of claim 1, wherein the configurational dependency is a pre-requisite dependency.

4. The computer program product of claim 1, wherein the computer code to generate the action includes computer code to transmit a notification of an upgrade failure if the upgrade is unsupported by the second computer program.

5. The computer program product of claim 1, wherein the computer code to generate the action includes computer code to return the first computer program to the first version of the first computer program.

6. The computer program product of claim 1, wherein, subsequent to upgrading the first computer program from the first version to the second version, the computer code to generate the action includes computer code to prevent the execution of the second computer program if the upgrade is unsupported by the second computer program.

7. The computer program product of claim 1, wherein the first computer program is an operating system and the second computer program is other software.

8. The computer program product of claim 1, wherein the configurational dependency is a co-requisite dependency.

9. The computer program product of claim 1, wherein the computer code to determine whether the upgrade is unsupported by the second computer program includes executing a script, wherein the script is configured to determine whether the second computer program is configured to operate with the second version of the first computer program, based on, at least, the updated table.

10. A computer system comprising:

one or more computer processors;

one or more computer-readable storage media;

program instructions stored on the computer-readable storage media for execution by at least one of the one or more processors, the program instructions comprising:

program instructions to:

detect an upgrade, from a first version to a second version, of a first computer program that is executing on a computing device that includes the processor, wherein the computing device includes a plurality of executing computer programs, wherein:

the plurality of executing computer programs includes the first computer program and a second computer program; and the upgrade comprises an installation of a first package associated with the first computer program, wherein the first package includes a first set of metadata;

update a table with the first set of metadata of the first package, wherein:

the table includes a second set of metadata associated with the first computer program and a third set of metadata associated with the second computer program; and the metadata associated with each of the first computer program and the second computer program includes, at least, a configurational dependency;

determine that the second computer program has the configurational dependency to the first computer program, based on the updated table;

determine that the upgrade is unsupported by the second computer program, based on the updated table; and generate an action in response to the determination that the upgrade is unsupported by the second computer program.

11. The computer system of claim 10, wherein the configurational dependency is a pre-requisite dependency.

12. The computer system of claim 10, wherein the computer code to generate the action includes computer code to transmit a notification of an upgrade failure if the upgrade is unsupported by the second computer program.

13. The computer system of claim 10, wherein the computer code to generate the action includes computer code to return the first computer program to the first version of the first computer program.

14. The computer system of claim 10, wherein, subsequent to upgrading the first computer program from the first version to the second version, the computer code to generate the action includes computer code to prevent the execution of the second computer program if the upgrade is unsupported by the second computer program.

15. The computer system of claim 10, wherein the first computer program is an operating system and the second computer program is other software.

16. The computer system of claim 10, wherein the configurational dependency is a co-requisite dependency.

17. The computer system of claim 10, wherein the computer code to determine whether the upgrade is unsupported by the second computer program includes executing a script, wherein the script is configured to determine whether the second computer program is configured to operate with the second version of the first computer program, based on, at least, the updated table.

\* \* \* \* \*